Oct. 12, 1943.  F. A. G. PIRWITZ  2,331,569
PHOTOGRAPHIC SHUTTER
Filed Aug. 18, 1941   5 Sheets-Sheet 1
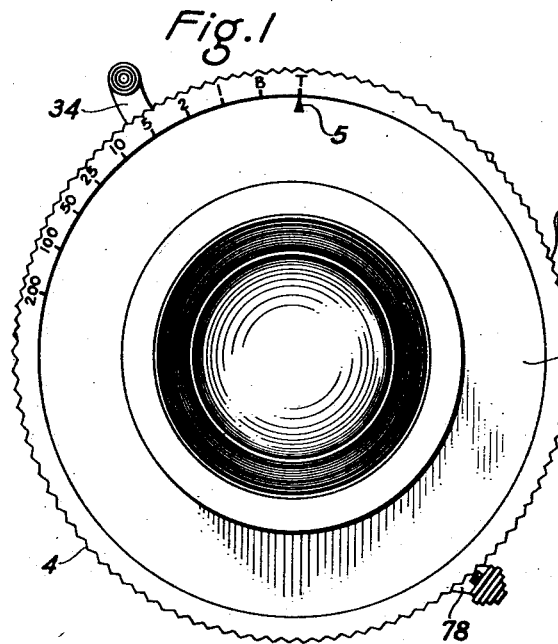
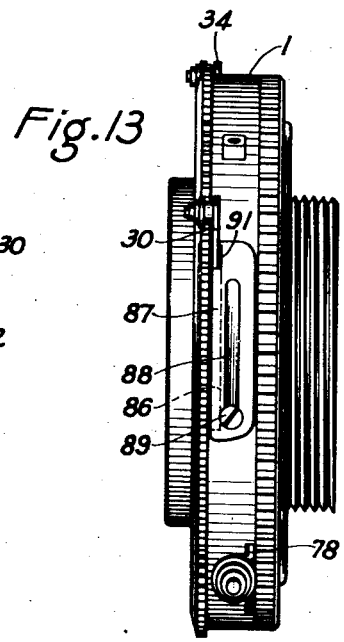
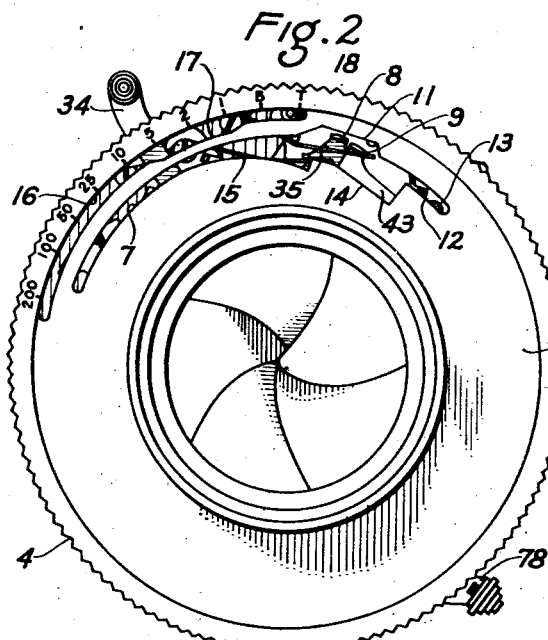
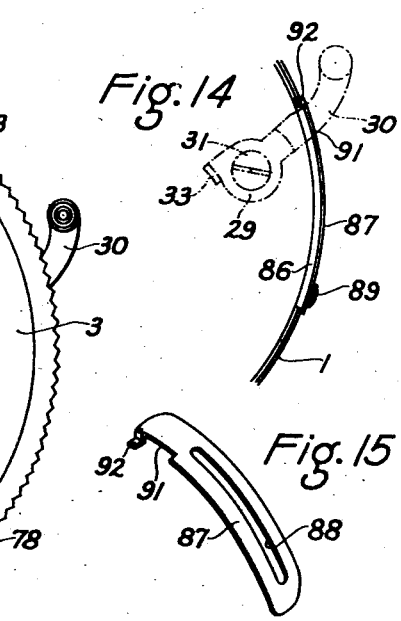
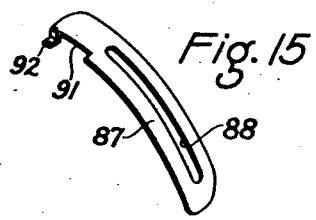
Friedrich A. Gustav Pirwitz
INVENTOR
BY Harold R. Stonebraker
ATTORNEY Oct. 12, 1943.   F. A. G. PIRWITZ   2,331,569
PHOTOGRAPHIC SHUTTER
Filed Aug. 18, 1941   5 Sheets-Sheet 2

Friedrich A. Gustav Pirwitz
INVENTOR

Harold L. Stonebraker BY
ATTORNEY

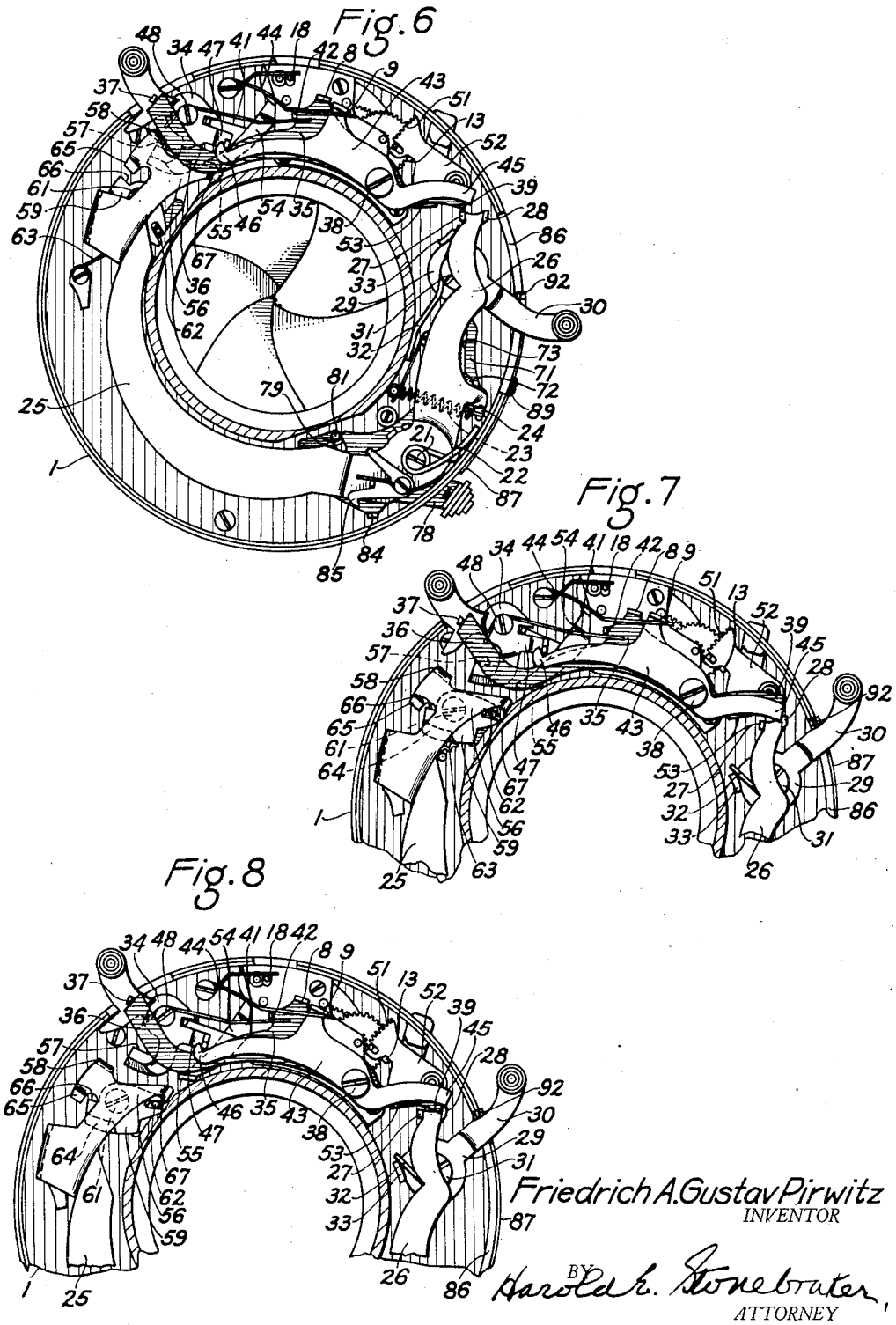

Oct. 12, 1943.  F. A. G. PIRWITZ  2,331,569
PHOTOGRAPHIC SHUTTER
Filed Aug. 18, 1941   5 Sheets-Sheet 4

Friedrich A. Gustav Pirwitz
INVENTOR

Harold E. Stonebraker
ATTORNEY

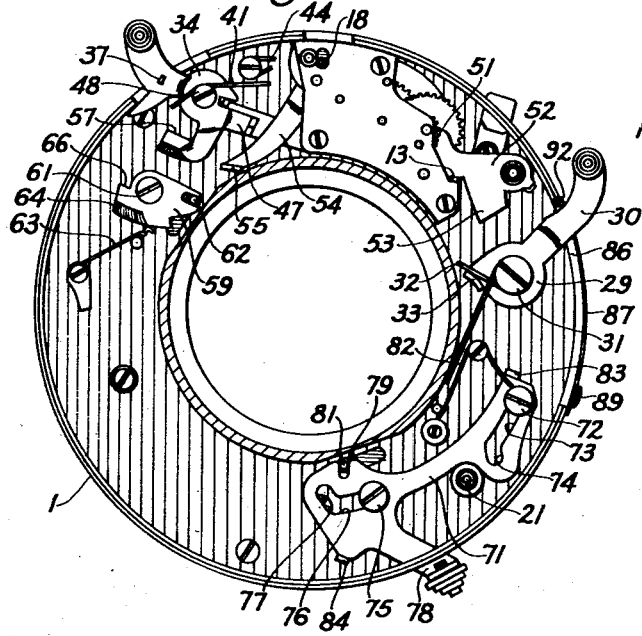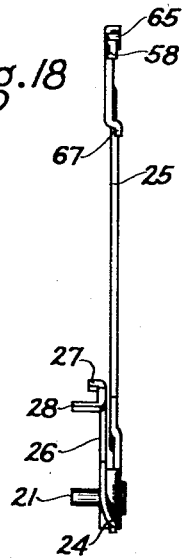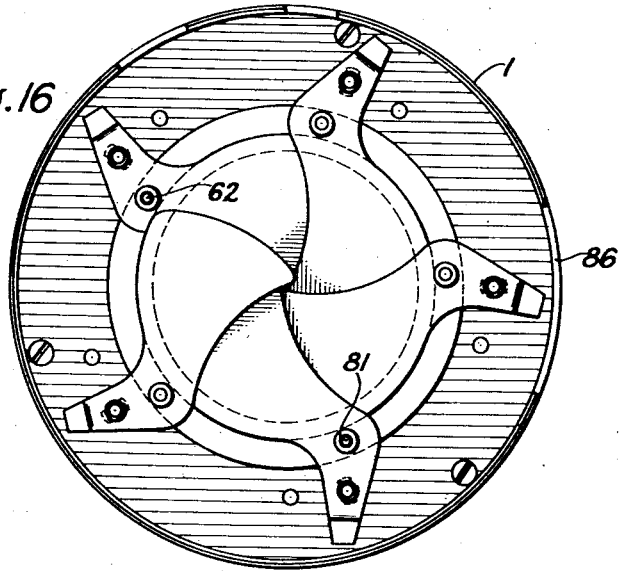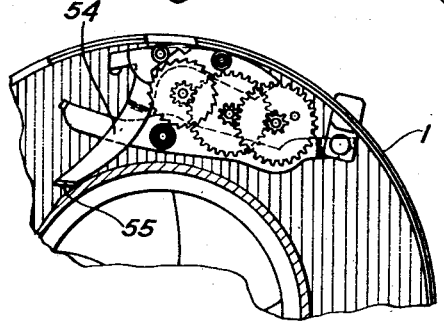
Friedrich A. Gustav Pirwitz
INVENTOR

Patented Oct. 12, 1943

2,331,569

UNITED STATES PATENT OFFICE 2,331,569

PHOTOGRAPHIC SHUTTER

Friedrich A. Gustav Pirwitz, Rochester, N. Y., assignor to Wollensak Optical Company, Rochester, N. Y., a corporation of New York Application August 18, 1941, Serial No. 407,265

24 Claims. (Cl. 95—63)

This invention relates to a photographic shutter of the set type, in which a master operating member is put under tension to effect movement of the shutter for either time, bulb, or instantaneous exposures when released by operation of a trigger, and has for its purpose to afford a structure with parts designed and cooperating to increase the speed of operation, which is durable and efficient over a long period of time owing to a reduction in wear and protection of delicate parts of the mechanism, and which when used on a reflex camera permits opening the shutter for focusing after the master operating member has been moved to set position.

A further purpose of the invention is to afford a shutter mechanism that lends itself particularly for use in connection with electrically operated controls such as used in flashlight photography.

An additional object of the invention is to afford a shutter of the above mentioned type provided with simple and practical means for opening the shutter to permit focusing after the master operating member has been moved to set position, affording in this respect a construction particularly useful in connection with reflex cameras.

More particularly the invention has for its purpose to afford stop mechanism governing the releasing movements of the master operating member for time and bulb exposures of such a character as to require a relatively short stroke and comparatively easy movement of the releasing trigger, thus providing structure that lends itself efficiently to flashlight operations in which the releasing trigger is connected to and operated by electrical mechanism such as a magnet, and where a short easy stroke of the trigger with little resistance to overcome is necessary.

Another object of the invention is to afford a construction in which the escapement means controlling the retarding mechanism is automatically disengaged from the retarding mechanism or thrown out of its operative position when the master operating member is moved to set position and returned to its operating position immediately when the master operating member is released, thus permitting the retarding mechanism to return to initial position upon setting the master operating member without controlling movement of the escapement means and eliminating movement of the escapement means except when it is actually governing the operating movement of the retarding mechanism, thereby increasing the speed of operation and reducing wear on the delicate escapement.

A further object of the invention is to afford a structure, more particularly applicable to reflex cameras, in which the shutter, in addition to being governed by the master operating member, is under the control of a supplemental mechanism that can be manually operated to open the shutter to permit focusing after the master operating member has been set and before releasing the controlling trigger, such supplemental shutter operating mechanism being locked against movement by the master operating member when the latter is in its initial position and released for movement when the latter has been moved to set position.

To these and other ends, the invention consists in the construction and arrangement of parts that will appear clearly from the following description when read in conjunction with the accompanying drawings, the novel features being pointed out in the claims following the detailed description.

In the drawings:

Fig. 1 is a plan view of a shutter constructed in accordance with the invention, with the cam plate set for a time exposure;

Fig. 2 is a similar view with the cover or index plate removed, exposing the cam plate and the operating mechanism thereunder;

Fig. 6 is a view similar to Fig. 5 showing the position of the parts when the setting lever has been moved to actuate the master operating member to set position, the stop members being positioned for a time exposure;

Fig. 7 is a similar view, partially broken away, showing the position assumed by the parts upon the initial movement of the controlling trigger for a time exposure;

Fig. 8 is a view similar to Fig. 7, showing the position of the parts when the trigger has returned to initial position from the position illustrated in Fig. 7, the parts being then in readiness for the second movement of the trigger to complete the time exposure;

Fig. 11 is a similar view showing the final position of the supplemental shutter operating mechanism when it has completed its movement to open the shutter for focusing;

Fig. 13 is a view in side elevation of the structure shown in Fig. 1;

Fig. 14 is a detail sectional view showing in edge elevation the guard plate connected to the setting lever for covering the opening in the housing in which said lever travels;

Fig. 15 is a detail perspective view of the guard plate illustrated in Figs. 13 and 14;

Fig. 16 is a detail sectional view illustrating the connection between the shutter and its operating means;

Fig. 18 is a view in side elevation of the same, and

Fig. 19 is a detail view of the escapement mechanism.

Figure 3:
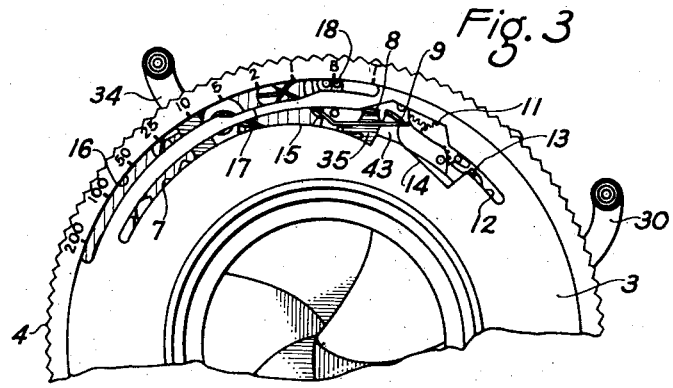
Fig. 3 is a view similar to Fig. 2 showing the cam plate adjusted for a bulb exposure.

Referring more particularly to the drawings in which like reference numerals refer to the same parts throughout the several views, 1 designates a housing containing the shutter mechanism, 2 is a fixed cover or index plate, and 3 is a rotatably adjustable cam plate having a knurled edge 4 by which it can be turned readily, and provided with index markings thereon for bulb, time, and instantaneous exposures from one second to 1/200 part of a second, for cooperation with the index mark 5 on the fixed index plate 2.

Figure 4:
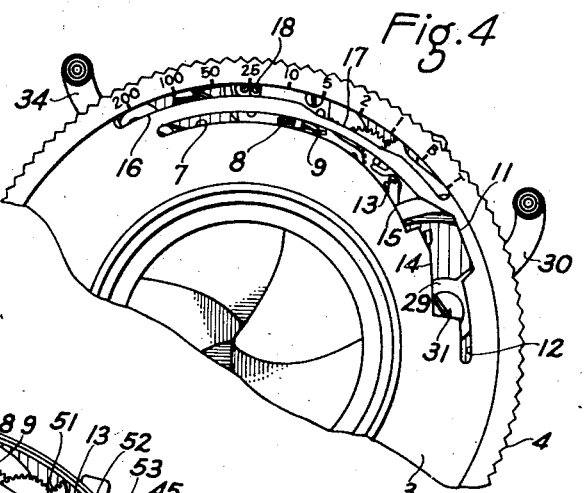
Fig. 4 is a similar view showing the cam plate adjusted for an instantaneous exposure of 1/25 of a second.

The cam plate 3 is provided with a slot including a surface 7 for engaging and retaining the lugs 8 and 9 on the time and bulb stop members respectively, to be described presently, when the cam plate is set for an instantaneous exposure, as shown in Fig. 4, or to engage the lug 8 on the time stop member when the cam plate is adjusted for a bulb exposure, as in Fig. 3.

The cam plate 3 is also provided with a cutaway portion 11 to free the lugs 8 and 9 on the time and bulb stop members when the cam plate is set for a time exposure, a surface 12 for retaining an arm 13 on the retarding mechanism when the cam plate is set for a time or bulb exposure, and surfaces 14 and 15 for governing the position of the arm 13 of the retarding mechanism when the cam plate is adjusted for various speeds of instantaneous exposures. 16 designates a slot in the cam plate cut away at 17 and acting to govern the position of the usual escapement means controlling the retarding mechanism, such positioning of the escapement means being determined by a pin 18 carried by the support for the escapement pawl and extending into said slot.

Figure 5:
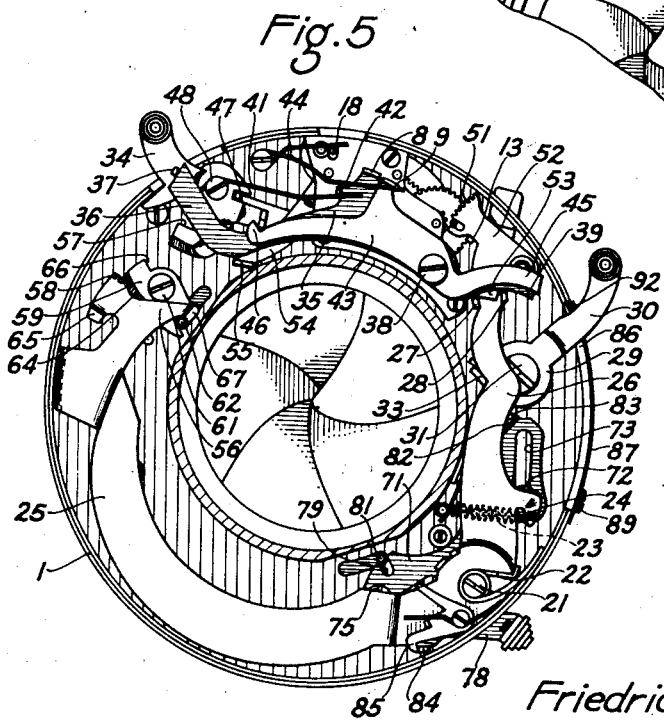
Fig. 5 is a horizontal sectional view showing the master operating member and cooperating parts in elevation and in their initial position prior to setting the master operating member.

Referring to Fig. 5, the master operating member is pivoted at 21, being held in initial position by the spring 22 and also by a coil spring 23 connected at one end to a stationary post and at its other end to an ear 24 on the master operating member, which includes an operating end portion 25 and a control end portion 26. The control end portion 26 is provided at its free end with a lug 27 which engages the retarding mechanism and an upstanding arm 28 with which the time and bulb stop members cooperate in a manner that will appear presently, while 29 is a setting lever having an operating finger portion 30, and pivoted at 31, said lever being retained in normal position by a spring 32, see Fig. 6. 33 is a lug on the setting lever 29 engageable with the control end portion of the master operating member and acting to move the latter from the position shown in Fig. 5 to the position shown in Fig. 6, when the setting lever is operated. During this setting movement of the master operating member, the operating end portion 25 moves from the position shown in Fig. 5 to the position shown in Fig. 6 into retaining engagement with the trigger 34, as will be described more fully hereinafter, it being understood that when the trigger is operated to release the master operating member, the shutter is opened and closed in the same manner generally as disclosed in my copending application Serial No. 403,077, filed July 19, 1941. The operation of the stop members for controlling the return movement of the master operating member for time and bulb exposures will now be described in detail.

The time and bulb stop members are preferably in the form of plates, the time stop member or plate being designated at 35, see Figs. 5 and 6, and provided at its inner end with an extension 36, the extremity of which engages a lug 37 on the trigger 34. The stop plate 35 is pivoted on the post 38 and includes a stop portion 39 at its outer end for engagement with the master operating member, while 41 is a spring engaging a lug 42 on the stop plate and acting to move the latter in a clockwise direction about its pivotal point and thus normally retain the stop portion 39 in its lowermost position and its opposite end 36 in its uppermost position, as shown in Fig. 5.

43 designates the bulb stop member or plate preferably pivoted concentrically with the time stop member 35 on the post 38 and controlled by a spring 44 engaging the aforementioned lug 9 and acting to move the stop plate 43 in a clockwise direction. The stop plate 43 includes the stop portion 45 at its outer end for governing the movement of the master operating member, and a nose 46 at its inner end that is engaged by an arm 47 on the trigger 34.

The trigger 34 is pivoted at 48 and when operated from the position shown in Figs. 5 and 6 to that shown in Fig. 7, it moves the stop plate 35 in an anti-clockwise direction against the action of its controlling spring by the engagement of lug 37 with the extension 36 on the stop plate, while at the same time the arm 47 moves outwardly away from the nose 46, releasing the stop plate 43 and permitting it to move in a clockwise direction under the impulse of its spring.

The stop portions 39 and 45 thus assume the positions shown in Fig. 7, and upon the initial return movement of the control end portion 26 of the master operating member, its arm 28 engages the stop portion 45 on the stop plate 43 and is held thereby until the trigger is released. Thereupon, the stop portion 39 on stop plate 35, being thereby released, moves downwardly into the path of the arm 28 so that by the time the stop portion 45 has assumed its initial position, the stop portion 39 is in the path of the arm 28 on the master operating member, and acts to retain the latter, as shown in Fig. 8, until the trigger is again operated to complete the time exposure operation.

For a bulb exposure, the cam plate is adjusted to the position illustrated in Fig. 3, moving the lug 8 and with it the time stop member 35 in an anti-clockwise direction to the position shown in Fig. 7, so that its stop portion is out of the path of the arm 28 on the master operating member. Then when the trigger is operated for a bulb exposure, it releases the stop plate 43 for movement in a clockwise direction so that its stop portion 45 is in the path of the arm 28, as shown in Fig. 7, the shutter being thus retained open as long as the trigger is held, and upon releasing the trigger, the stop plate 43 is moved back to its initial position by the arm 47 engaging the nose 46 and the master operating member is released for its final movement to close the shutter.

For an instantaneous exposure for any selected period of time, the cam plate is adjusted so that the lugs 8 and 9 are both retained by the cam surface 7, as shown in Fig. 4, and when the trigger is operated to release the master operating member, neither stop member moves and the stop portions are therefore held out of the path of the arm 28 on the master operating member which is governed only by the retarding mechanism that will now be described.

The retarding mechanism, which is generally similar to the construction disclosed in my copending application above referred to, includes a gear segment 51 engageable with a pinion forming part of the gear train, the gear segment 51 being formed on a plate 52 including an arm 53 which lies in the path of the lug 27 on the control end portion of the master operating member, so that when the latter is in its initial position, as shown in Fig. 5, the lug 27 engages the plate 52 and holds it and the retarding mechanism in their extreme positions. When the master operating member is moved to set position, the lug 27 moves away from plate 52, releasing the latter and permitting the retarding mechanism to move to its active position under the impulse of its controlling spring, in readiness to engage and retard the return movement of the master operating member when the latter is released by the trigger.

The retarding mechanism includes an escapement means, as usual in this type of construction, the escapement pawl being mounted on a support or plate which carries the aforementioned pin 18, see Figs. 3 to 6, whereby the escapement means is withdrawn from operative engagement with the retarding mechanism by the cam plate for time, bulb, and the higher speeds of instantaneous exposures.

In order to reduce the time required for the retarding mechanism to resume its initial position when released and thus speed up the time between successive exposures as well as to reduce wear on the delicate escapement mechanism, it is desirable to disengage the escapement pawl from the retarding mechanism when the master operating member is moved to set position and to reengage the escapement pawl with the retarding mechanism immediately on releasing the master operating member. Heretofore in such structures, the escapement pawl has been constantly in engagement with the retarding mechanism during the setting as well as the releasing movements of the master operating member and consequently movement of the retarding mechanism was slowed down somewhat during its return to initial position while setting the master operating member. With the present construction, this return movement of the retarding mechanism during the setting operation of the master operating member is speeded up owing to the disengagement of the escapement mechanism, and the wear on the latter is greatly reduced because it is engaged with the retarding mechanism only at the time when it is functioning.

In order to effect this result, the support or plate carrying the escapement pawl is provided with an extension 54, see Fig. 5, having a cam lug 55 at its end which lies in the path of the end 56 of the operating end portion 25 of the master operating member so that when the latter is moved to set position, the end 56 engages the lug 55 and moves lever 54 from the position shown in Fig. 5 to the position shown in Fig. 6, to disengage the escapement pawl from the retarding mechanism. The escapement pawl support is returned to initial position by the end of spring 44 engaging the pin 18, see Fig. 5, when the master operating member moves away from set position.

Referring to Fig. 5, the lug 27 normally engages the plate 52 of the retarding mechanism and holds the latter in its inactive position or at the limit of its operative movement, and when the master operating member is moved to set position, as in Fig. 6, the retarding mechanism is released by the lug 27 and moves to operative position. This return movement of the retarding mechanism is hastened and entirely completed by the time the master operating member reaches its set position, owing to the escapement means being disengaged from the retarding mechanism as the master operating member reaches the limit of its set position, so that no further resistance is offered to the return movement of the retarding mechanism, as contra-distinguished from prior structures in which the escapement pawl remains engaged with the retarding mechanism and necessitated movement of the latter for a second or more after the master operating member had reached the limit of movement to set position. By thus disengaging the escapement pawl from the retarding mechanism by means of the master operating member, the return movement of the retarding mechanism is considerably quicker, and wear on the escapement mechanism is decreased to a great extent because of it being disengaged from the retarding mechanism during a considerable part of the latter's movement, thus increasing the efficiency and life of the mechanism.

Figure 9:
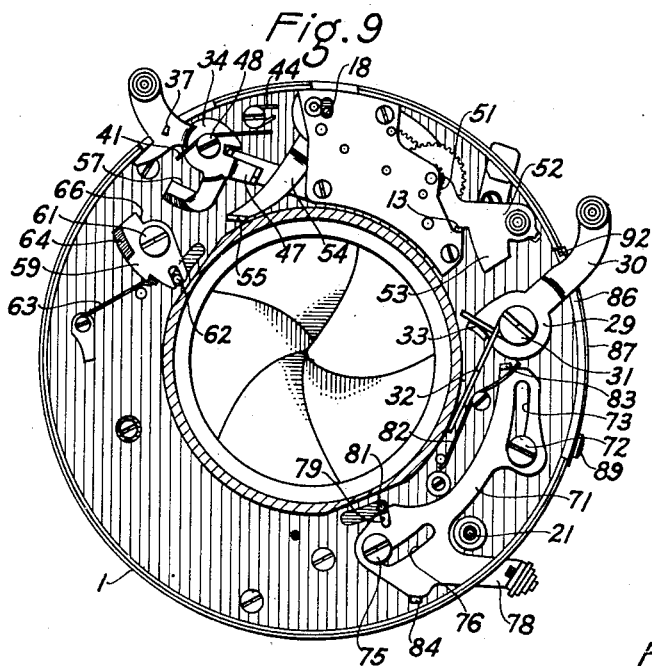
Fig. 9 is a view similar to Fig. 6 with the master operating member and stop members removed, and showing the normal or inactive position of the supplemental shutter operating focusing mechanism.
Figure 12:
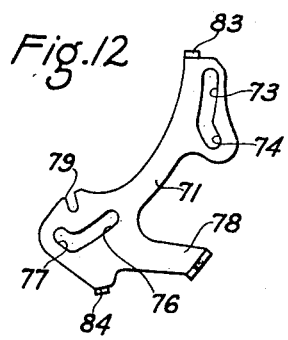
Fig. 12 is a detail plan view of the actuating plate which effects opening of the shutter for focusing.

The master operating member is held in set position and operates the shutter by parts generally similar to my copending application above mentioned, and including a locking member 57 on the trigger that engages a depending lug 58 on the master operating member when the latter reaches the limit of its movement to set position, see Fig. 6, and holds the master operating member in the position there shown until the trigger is operated to move the locking portion 57 out of engagement with the lug 58 and permit return movement of the master operating member. During such return or operating movement, the shutter is opened and closed, to effect which operation, there is provided a shutter operating lever 59 pivoted at 61 and having a bifurcated portion engaging a shutter member or pin 62 that is mounted on the usual shutter operating ring, see Fig. 11, while 63 is a leaf spring acting to hold the shutter operating lever 59 in its normal position against accidental displacement, as in Fig. 9, Upon the setting movement of the master operating member, the lug 58 rides over the bevelled surface 64 on the shutter operating lever and upon return movement of the master operating member, the dog 65, see Figs. 5 and 6, engages a shoulder 66 on the shutter operating lever, swinging the same from the position shown in Figs. 5 and 6 to the position shown in Fig. 7 to open the shutter.

Upon the final movement of the master operating member, the nose 67, provided at the end of the latter, engages the shutter member or pin 62 and moves the latter from the position shown in Fig. 8 to the position shown in Fig. 5 to close the shutter and retain it positively in closed position, such movement of the master operating member to open and close the shutter being continuous or intermittent, dependent upon whether the cam plate is set for an instantaneous exposure, or a time or bulb exposure, as hereinbefore described.

Where the shutter is employed with a reflex camera, necessitating opening the shutter for focusing, it is desirable to open the shutter for focusing after the master operating member has been moved to set position since the shutter is held closed by the master operating member. To accomplish this, there is provided a supplemental shutter operating means independent of the master operating member so that the shutter can be manually opened to permit focusing after the master operating member has been moved to set position without disturbing the latter and without operating the trigger. This supplemental shutter operating means is locked against movement when the master operating member is in its inactive position and is automatically released for movement when the master operating member moves to its set position, thus permitting the shutter to be manually opened without disturbing the position of the master operating member or the trigger controlling mechanism.

Referring to Figs. 9 to 12 inclusive, this supplemental shutter operating mechanism includes a slidable actuating plate 71 having at one end a cam slot guided on a post 72 and including a straight elongated portion 73 and a short angularly arranged portion 74, while at its opposite end the actuating plate has a cam slot guided on the post 75 and including a straight elongated portion 76 and a short angularly arranged portion 77. 78 designates an extension projecting through the housing and affording a finger piece for moving the actuating plate which is slidable on the posts 72 and 75.

The actuating plate 71 is also provided with a slot 79 arranged to engage a second shutter member or pin 81 carried by the shutter operating ring, so that when the actuating plate is moved, the slot 79 engages the pin 81 and causes a corresponding movement of the pin and shutter operating ring to open the shutter, as shown in Fig. 11. 82 designates a spring engaging a lug 83 on the actuating plate to return it to initial position.

In order to lock the actuating plate against movement except when the master operating member is in set position, a lug 84 is provided on the actuating plate and engages a stop 85 on the master operating member, see Fig. 5, when the latter is in its unset position. In this position the master operating member is engaged with the shutter member or pin 62 to hold the shutter closed, and it is necessary to prevent movement of the supplemental shutter operating means at such time. When the master operating member has been moved to set position, its operating end portion releases the shutter operating ring and at the same time the locking portion 85 releases the lug 84 and frees the supplemental shutter operating means for movement.

Figure 10:
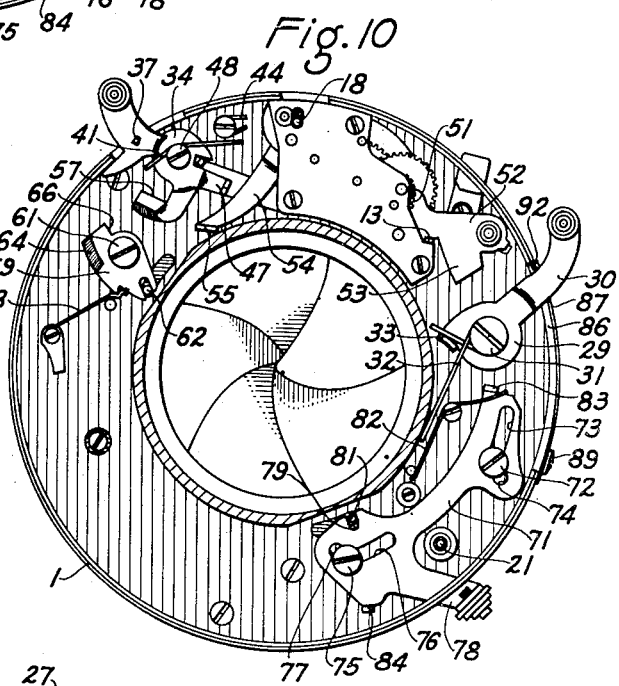
Fig. 10 is a view similar to Fig. 9 showing the initial movement of the supplemental shutter operating focusing mechanism.
Figure 17:
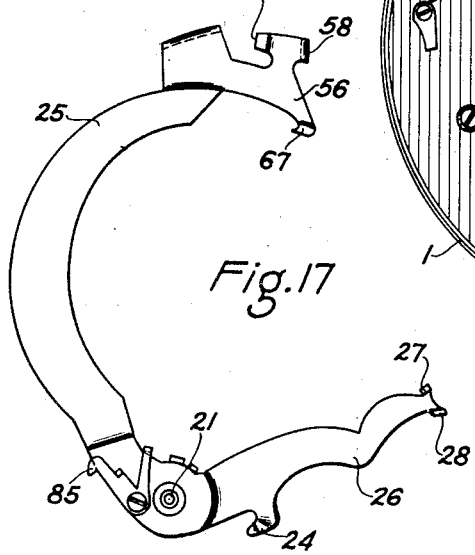
Fig. 17 is a detail plan view of the master operating member.

When the finger piece 78 is operated to slide the actuating plate 71 on the posts 72 and 75, the initial movement causes the forward end of the plate with slot 79 to move inwardly or radially of the shutter to bring slot 79 into engagement with the shutter member or pin 81, while the rear end of the actuating plate moves a corresponding distance outwardly, the position of the actuating plate at the end of such initial movement being illustrated in Fig. 10 where it is engaged with the pin 81 and in readiness to open the shutter. Upon continued movement of the actuating plate, the shutter is opened, the final position of the parts after such movement being illustrated in Fig. 11, in which the actuating plate has moved to its extreme operating position for opening the shutter. Upon completion of the focusing operation, the actuating plate is returned to its initial position by the spring 82 or in any other suitable way upon releasing the finger piece 78.

In the construction disclosed, the setting lever finger portion 30 travels in a slot 86 in the housing, and since this is located adjacent to the supplemental shutter operating means, it is desirable to protect these parts against dust and dirt entering through the slot 86. To accomplish this, there is provided a guard member which covers the slot 86 when the setting lever is in its normal or inactive position. Referring to Figs. 13 to 15, the guard member comprises a curved plate including a wall 87 which overlies the slot 86, the curved guard plate being slotted at 88 for engagement with a post 89 on which it is guided in its sliding movement, while at its opposite end, the guard plate is recessed or cut away at 91 to accommodate the finger portion 30 that extends through said cut-away portion 91. 92 is a lug on the guard plate engaging under the overlying recessed edge of the cam plate 3 and acting to hold the guard plate in close proximity and engaged with the cam plate during its sliding movement on the housing. With this arrangement, the wall 87 on the guard plate covers the slot or opening 86 in the manner shown in Fig. 13, and when the setting lever 29 is operated to move the master operating member, the guard plate travels with it circumferentially of the housing, sliding on the post 89 while the lug 92 is guided by engagement with the overlying edge of the cam plate, and when the setting lever is restored to its initial position, the guard plate automatically returns with it and is in position to close the slot or opening 86 at all times except when the setting lever is operated. This protects the interior parts against dust and dirt and increases the life of the mechanism.

While the invention has been described in relation to certain details of construction, it is not limited in this respect, and this application is intended to cover such modifications or departures as may come within the intent of the improvements or the scope of the following claims.

I claim:

1. In a photographic shutter, the combination with a master operating member, a shutter blade member, and means on the master operating member that engages said shutter blade member to effect closing of the shutter and to retain the shutter in closed position, the shutter blade member being movable away from the master operating member when the latter is in set position, of manually controlled supplemental shutter operating means that is mounted independently of the master operating member and movable to open the shutter and permit focusing when the master operating member is in set position and disengaged from the shutter blade member, and means carried by the master operating member engaging said supplemental shutter operating means and acting to retain the same against movement when the master operating member is in unset position and engaged with the shutter blade member and to free the supplemental shutter operating means for movement when the master operating member is in set position.

2. In a photographic shutter, the combination with a master operating member, a shutter blade member, and means on the master operating member that engages said shutter blade member to effect closing of the shutter and to retain the shutter in closed position, the shutter blade member being movable away from the master operating member when the latter is in set position, of supplemental shutter operating means that is mounted independently of the master operating member and movable to open the shutter and permit focusing when the master operating member is in set position and disengaged from the shutter blade member, said supplemental shutter operating means comprising a second shutter blade member, and a manually operated actuating device normally disengaged therefrom and movable into engagement therewith to open and close the shutter when the master operating member is in set position and disengaged from the shutter blade member.

3. In a photographic shutter, the combination with a master operating member, a shutter blade member, a shutter actuating lever connected with said shutter blade member, means on the master operating member that engages and moves said actuating lever to open the shutter, and additional means on the master operating member that engages said shutter blade member to effect closing of the shutter and to retain the shutter in closed position, the shutter blade member being movable away from the master operating member when the latter is in set position, of supplemental shutter operating means for opening the shutter to permit focusing when the master operating member is in set position, said supplemental shutter operating means comprising a second shutter blade member, an actuating device mounted independently of the master operating member and normally disengaged from said second shutter blade member, said actuating device being operable into engagement with the second shutter blade member when the master operating member is in set position and disengaged from the first shutter blade member to permit focusing, manual means for operating said actuating device, and means on the master operating member normally engaging said actuating device and holding it in disengaged position, movement of the master operating member to set position effecting release of the actuating device and permitting movement thereof to open the shutter for focusing.

4. In a photographic shutter, the combination with a master operating member, a shutter blade member, and means on the master operating member that engages said shutter blade member to effect closing of the shutter and to retain the shutter in closed position, the shutter blade member being movable away from the master operating member when the latter is in set position, of manually controlled supplemental shutter operating means that is mounted independently of the master operating member and movable to open the shutter and permit focusing when the master operating member is in set position and disengaged from the shutter blade member, said supplemental shutter operating means comprising a second shutter blade member, an actuating plate normally disengaged therefrom and movable inwardly to engage said second shutter blade member and thence endwise to actuate the second shutter blade member when the master operating member is in set position, and means carried by the master operating member engaging said actuating plate and acting to hold the latter disengaged from said second shutter blade member when the master operating member is in unset position and to release the actuating plate to permit opening the shutter for focusing when the master operating member is in set position.

5. In a photographic shutter, the combination with a master operating member, a shutter blade member controlled by the master operating member, of supplemental shutter operating means to permit focusing comprising a second shutter blade member, and a manually operated actuating plate having a slotted portion normally disengaged from said shutter blade member and movable radially of the shutter for engagement therewith, said actuating plate being provided at its ends with cam slots each including an elongated portion and a short angular portion, said cam slots being guided on posts and controlling the movement of said actuating plate whereby its front and back ends move initially inwardly and outwardly respectively with reference to said shutter blade member and thence endwise to effect opening of the shutter.

6. In a photographic shutter, the combination with a master operating member, a shutter blade member, a shutter actuating lever connected with said shutter blade member, means on the master operating member that engages and moves said actuating lever to open the shutter, and additional means on the master operating member that engages said shutter blade member to effect closing of the shutter and to retain the shutter in closed position, of supplemental shutter operating means for opening the shutter to permit focusing when the master operating member is in set position, said supplemental shutter operating means comprising a second shutter blade member, an actuating plate operable into engagement with said second shutter blade member to effect movement thereof and to open and close the shutter, said actuating plate having a slotted portion normally disengaged from said second shutter blade member and movable radially of the shutter for engagement therewith, said actuating plate being provided at its ends with cam slots each including an elongated portion and a short angular portion, said cam slots being guided on posts and controlling the movement of said actuating plate whereby its front and back ends move initially inwardly and outwardly respectively with reference to said second shutter blade member and further movement of the actuating plate is in the direction of the operating motion of said shutter blade member to effect opening of the shutter, a finger portion carried by said actuating plate for operating it manually, and means carried by the master operating member engaging said actuating plate to hold the latter disengaged from said shutter blade member except when the master operating member is in set position.

7. In a photographic shutter, the combination with a master operating member, a shutter blade member located in the path of a portion of the master operating member which thereby effects closing of the shutter and retains the shutter in closed position, the shutter blade member being movable away from the master operating member when the latter is in set position, of supplemental shutter operating means that is mounted independently of the master operating member and movable to open the shutter for focusing when the master operating member is in set position and disengaged from the shutter blade member, said supplemental shutter operating means including a second shutter blade member located under the master operating member, and a manually operated device located under the master operating member and engageable with said second shutter blade member to open the shutter when the master operating member is in set position and disengaged from the first shutter blade member.

8. In a photographic shutter, the combination with a master operating member, a shutter blade member located in the path of a portion of the master operating member which thereby effects closing of the shutter and retains the shutter in closed position, the shutter blade member being movable away from the master operating member when the latter is in set position, of supplemental shutter operating means that is mounted independently of the master operating member and movable to open the shutter and permit focusing when the master operating member is in set position and disengaged from the shutter blade member, said supplemental shutter operating means including a second shutter blade member located under the master operating member, and a manually operated slidable plate located under the master operating member and normally disengaged from the second shutter blade member, said slidable plate being movable inwardly to engage the second shutter blade member and thence endwise to actuate the latter and open the shutter when the master operating member is in set position and disengaged from the first shutter blade member.

9. In a photographic shutter, the combination with a master operating member, a shutter blade member located in the path of a portion of the master operating member which thereby effects closing of the shutter and retains the shutter in closed position, the shutter blade member being movable away from the master operating member when the latter is in set position, of supplemental shutter operating means that is mounted independently of the master operating member and movable to open the shutter and permit focusing when the master operating member is in set position and disengaged from the shutter blade member, said supplemental shutter operating means including a second shutter blade member located under the master operating member, a manually operated slidable plate located under the master operating member and normally disengaged from the second shutter blade member, said slidable plate being movable inwardly to engage the second shutter blade member and thence endwise to actuate the latter and open the shutter when the master operating member is in set position and disengaged from the first shutter blade member, and means carried by the master operating member and engaging said slidable plate to retain the latter against movement when the master operating member is in unset position, said last mentioned means being movable to release the plate when the master operating member is in set position.

10. In a set type photographic shutter, the combination with a master operating member pivoted between its ends, of a shutter blade member located in the path of one end of the master operating member, a pair of stop members pivoted between their ends and having stop portions at their outer ends alternately engageable with the opposite end of the master operating member to control its movements for time and bulb exposures, spring means actuating the stop members in clockwise direction, and a pivoted trigger having a relatively short stroke, said trigger being normally engaged with the inner ends of the stop members on opposite sides of its pivotal point and acting during its initial movement when operated to move the time stop member in an anti-clockwise direction and to release the bulb stop member for movement in a clockwise direction.

11. In a set type photographic shutter, the combination with a master operating member pivoted between its ends, of a shutter blade member located in the path of one end of the master operating member, a pair of stop members coaxially pivoted between their ends and having stop portions at their outer ends cooperating with the opposite end of the master operating member to control its movement for time and bulb exposures, said stop members being spring-actuated in a clockwise direction, and a pivoted trigger having a relatively short stroke, said trigger being normally engaged with said stop members at their inner ends on opposite sides of its pivotal point and acting during its initial movement when operated to release the bulb stop member for movement in a clockwise direction and to move the time stop member in an anti-clockwise direction.

12. In a set type photographic shutter, the combination with a master operating member pivoted between its ends, of a shutter blade member located in the path of one end of the master operating member, a pair of stop members coaxially pivoted between their ends and having stop portions at their outer ends cooperating with the opposite end of the master operating member to control its movement for time and bulb exposures, said stop members being spring-actuated in a clockwise direction, and a pivoted trigger having a relatively short stroke and including an arm normally engaged with the adjacent end of the bulb stop member on one side of the pivotal point of the trigger and acting when operated to release the latter for movement in a clockwise direction, an extension on the adjacent end of the time stop member, and a lug carried by the trigger normally engaged with said extension on the opposite side of the pivotal point of the trigger and acting when the trigger is operated to move the time stop member in an anti-clockwise direction, said release of the bulb stop member and movement of the time stop member taking place during the initial movement of the trigger.

13. In a set type photographic shutter, the combination with a master operating member pivoted between its ends, of a shutter blade member located in the path of one end of the master operating member, a shutter actuating lever connected to said shutter blade member, the master operating member having means that engages and moves said shutter actuating lever whereby the master operating member while traveling in one direction effects opposite movements of the shutter blade member to open and close the shutter, a pair of stop members pivoted between their ends and having stop portions at their outer ends alternately engageable with the opposite end of the master operating member to control its movements for time and bulb exposures, spring means actuating the stop members in a clockwise direction, and a pivoted trigger having a relatively short stroke, said trigger being normally engaged with the inner ends of the stop members on opposite sides of its pivotal point and acting during its initial movement when operated to move the time stop member in an anti-clockwise direction and to release the bulb stop member for movement in a clockwise direction.

14. In a set type photographic shutter, the combination with a master operating member pivoted between its ends, of a shutter blade member located in the path of one end of the master operating member, a shutter actuating lever connected to said shutter blade member, the master operating member having means that engages and moves said shutter actuating lever whereby the master operating member while traveling in one direction effects opposite movements of the shutter blade member to open and close the shutter, a pair of stop members pivoted between their ends and having stop portions at their outer ends cooperating with the opposite end of the master operating member to control its movement for time and bulb exposures, said stop members being spring-actuated in a clockwise direction, and a pivoted trigger having a relatively short stroke, said trigger being normally engaged with said stop members at their inner ends on opposite sides of its pivotal point and acting during its initial movement when operated to release the bulb stop member for movement in a clockwise direction and to move the time stop member in an anti-clockwise direction.

15. In a set type photographic shutter, the combination with a master operating member pivoted between its ends, of a shutter blade member located in the path of one end of the master operating member, a shutter actuating lever connected to said shutter blade member, the master operating member having means that engages and moves said shutter actuating lever whereby the master operating member while traveling in one direction effects opposite movements of the shutter blade member to open and close the shutter, a pair of stop members pivoted between their ends and having stop portions at their outer ends cooperating with the opposite end of the master operating member to control its movement for time and bulb exposures, said stop members being spring-actuated in a clockwise direction, and a pivoted trigger having a relatively short stroke and including an arm normally in engagement with the adjacent end of the bulb stop member on one side of the pivotal point of the trigger and acting when operated to release the latter for movement in a clockwise direction, an extension on the adjacent end of the time stop member, and a lug carried by the trigger engageable with said extension on the opposite side of the pivotal point of the trigger and acting when the trigger is operated to move the time stop member in an anti-clockwise direction, said release of the bulb stop member and movement of the time stop member taking place during the initial travel of the trigger.

16. In a set type photographic shutter, the combination with a master operating member pivoted between its ends, of a shutter blade member located in the path of one end of the master operating member, a pair of stop members pivoted between their ends and having stop portions at their outer ends engageable with the opposite end of the master operating member to control its movements for time and bulb exposures, spring means actuating the stop members, and a pivoted trigger normally engaged with the inner ends of the stop members on opposite sides of its pivotal point and acting during its initial movement when operated to cause movement of said stop members in opposite directions.

17. In a photographic shutter, the combination with a master operating member, retarding mechanism that is spring-actuated to active position and controls the master operating member, the latter being governed during its return movement by the retarding mechanism and acting during its setting movement to release the retarding mechanism, and escapement means governing the retarding mechanism, of a device connected to the escapement means and located in the path of the master operating member for movement thereby, the master operating member acting automatically when moved to set position to disengage the escapement means from the retarding mechanism.

18. In a photographic shutter, the combination with a master operating member, retarding mechanism that is spring-actuated to active position and controls the master operating member, the latter being governed during its return movement by the retarding mechanism and acting during its setting movement to release the retarding mechanism, and escapement means governing the retarding mechanism, of a device located in the path of the master operating member for movement thereby and acting automatically to disengage the escapement means from the retarding mechanism when the master operating member is moved to set position.

19. In a photographic shutter, the combination with a master operating member, retarding mechanism that is spring-actuated to active position and controls the master operating member, the latter being governed during its return movement by the retarding mechanism and acting during its setting movement to release the retarding mechanism, and escapement means governing the retarding mechanism, of a support for the escapement means including an arm projecting into the path of the master operating member, said member acting automatically to disengage the escapement means from the retarding mechanism when the master operating member is moved to set position.

20. In a photographic shutter, the combination with a master operating member including a control end portion and an operating end portion, retarding mechanism that is spring-actuated and operatively associated with the control end portion of the master operating member, the latter being governed during its return movement by the retarding mechanism and acting during its setting movement to release the retarding mechanism, escapement means governing the retarding mechanism, of an arm connected to said escapement means and projecting into the path of the operating end portion of the master operating member, said member acting automatically to disengage the escapement means from the retarding mechanism when the master operating member is moved to set position.

21. In a photographic shutter, the combination with a master operating member, retarding mechanism that is spring-actuated to active position and controls the master operating member, the latter being governed during its return movement by the retarding mechanism and acting during its setting movement to release the retarding mechanism, and escapement means governing the retarding mechanism, of an operative connection to the escapement means that is moved by the master operating member acting automatically to disengage the escapement means from the retarding mechanism when the master operating member is moved to set position and to reengage the escapement means with the retarding mechanism as the master operating member moves away from set position.

22. In a photographic shutter, the combination with a master operating member including a control end portion and an operating end portion, retarding mechanism that is spring-actuated to active position and operatively associated with the control end portion, the master operating member being governed during its return movement by the retarding mechanism and acting during its setting movement to release the retarding mechanism, escapement means governing the retarding mechanism, and a support on which said escapement means is mounted, of an arm carried by said support having a lug located in the path of the operating end portion of the master operating member, said member acting automatically to disengage the escapement means from the retarding mechanism when the master operating member reaches the limit of its movement to set position and to release the escapement means for reengagement with the retarding mechanism as the master operating member is moved away from set position.

23. In a photographic shutter, the combination with a master operating member including a control end portion and an operating end portion, pivoted stop members including stop portions cooperating with the control end portion of the master operating member, retarding mechanism governing said control end portion, supplemental shutter opening means including a manually controlled slidable plate located beneath the control end portion of the master operating member and movable to open the shutter when the master operating member is in set position, a setting lever engaging said control end portion and operable to move the master operating member to set position, of a housing for said parts having an opening in its side wall in proximity to said supplemental shutter opening means, said setting lever including a finger portion extending through said opening in the housing, and a curved guard plate connected to and movable with said finger portion and including a portion which covers said opening in the housing when the setting lever is in initial position.

24. In a photographic shutter, the combination with a master operating member including a control end portion and an operating end portion, pivoted stop members including stop portions cooperating with the control end portion of the master operating member, retarding mechanism governing said control end portion, supplemental shutter operating means including a manually controlled slidable plate located beneath the control end portion of the master operating member and movable to open the shutter when the master operating member is in set position, a setting lever engaging the control end portion of the master operating member, of a housing for said parts having an opening in its side wall in proximity to said supplemental shutter operating means, said setting lever including a finger portion extending through and movable in said opening in the housing, and a curved guard plate connected at one end to said finger portion and slidable peripherally of the housing, a guide pin, the guard plate having a slot engaging said guide pin, and a portion extending over and concealing said opening in the housing when the setting lever is in initial position.

FRIEDRICH A. GUSTAV PIRWITZ.